US010494998B2

(12) United States Patent
McCune

(10) Patent No.: US 10,494,998 B2
(45) Date of Patent: Dec. 3, 2019

(54) LUBRICATION OF EPICYCLIC GEAR SYSTEM FOR GAS TURBINE ENGINE

(71) Applicant: United Technologies Corporation, Farmington, CT (US)

(72) Inventor: Michael E. McCune, Colchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 326 days.

(21) Appl. No.: 15/418,933

(22) Filed: Jan. 30, 2017

(65) Prior Publication Data

US 2018/0216531 A1     Aug. 2, 2018

(51) Int. Cl.
*F02C 7/06* (2006.01)
*F16H 57/04* (2010.01)
(Continued)

(52) U.S. Cl.
CPC .................. *F02C 7/06* (2013.01); *F02C 3/04* (2013.01); *F02C 7/36* (2013.01); *F02K 3/06* (2013.01);
(Continued)

(58) Field of Classification Search
CPC .. F04D 9/005; F04D 15/0011; F04D 27/0207; F04D 29/2277; F02C 7/06; F02C 7/36; F02C 3/04; F16H 57/0426; F16H 57/08; F16H 57/04; F16H 57/0486; F16H 57/0479; F16H 57/043; F16H 1/28; F16H 2057/085; F02K 3/06; F05D 2240/35; F05D 2220/32; F05D 2260/98; F05D 2260/40311
(Continued)

(56) References Cited

U.S. PATENT DOCUMENTS 4,271,928 A * 6/1981 Northern ................. B64C 27/12
                                              184/6.11
4,658,665 A * 4/1987 Strinzel ............... F16H 57/0442
                                              184/6.12
(Continued)

FOREIGN PATENT DOCUMENTS

| EP | 2264336 A1 | 12/2010 |
|---|---|---|
| EP | 2267338 A1 | 12/2010 |
| EP | 2554874 A2 | 2/2013 |

OTHER PUBLICATIONS

European Search Report Issued in EP Application No. 18153988.3, dated May 30, 2018, 7 Pages.

*Primary Examiner* — J. Todd Newton
(74) *Attorney, Agent, or Firm* — Cantor Colburn LLP

(57) ABSTRACT

An epicyclic gear system includes a sun gear, a ring gear, and two or more star gear assemblies enmeshed between the sun gear and the ring gear. Each star gear assembly includes a star gear and a journal bearing supportive of the star gear. The journal bearing includes one or more lubricant passageways to deliver a flow of lubricant to a selected location of the star gear assembly, wherein a first cross-sectional area of a lubricant passage of a first journal bearing of the two or more star gear assemblies is greater than a second cross-sectional area of the corresponding lubricant passage of a second journal bearing of the two or more star gear assemblies.

18 Claims, 3 Drawing Sheets

(51) Int. Cl.
*F16H 57/08* (2006.01)
*F02C 3/04* (2006.01)
*F02C 7/36* (2006.01)
*F02K 3/06* (2006.01)
*F16H 1/28* (2006.01)

(52) U.S. Cl.
CPC .............. *F16H 1/28* (2013.01); *F16H 57/04* (2013.01); *F16H 57/043* (2013.01); *F16H 57/0426* (2013.01); *F16H 57/0479* (2013.01); *F16H 57/0486* (2013.01); *F16H 57/08* (2013.01); *F05D 2220/32* (2013.01); *F05D 2240/35* (2013.01); *F05D 2260/40311* (2013.01); *F05D 2260/98* (2013.01); *F16H 2057/085* (2013.01)

(58) Field of Classification Search
USPC .......................................................... 415/11
See application file for complete search history.

(56) References Cited

U.S. PATENT DOCUMENTS

| | | | | |
|---|---|---|---|---|
| 5,472,383 A * | 12/1995 | McKibbin | ........... | F16H 57/0482 184/6.12 |
| 6,223,616 B1 * | 5/2001 | Sheridan | ............... | F16H 1/2827 184/6.12 |
| 7,866,444 B2 * | 1/2011 | Aldridge | ............. | F16C 33/6651 184/11.1 |
| 2008/0096714 A1 * | 4/2008 | McCune | ................ | F01D 25/20 475/159 |
| 2008/0116009 A1 * | 5/2008 | Sheridan | ................ | F01D 25/18 184/6.4 |
| 2008/0116010 A1 * | 5/2008 | Portlock | ................ | F01D 25/18 184/6.12 |
| 2010/0317478 A1 * | 12/2010 | McCune | ............... | F01D 25/166 475/159 |
| 2012/0108380 A1 * | 5/2012 | Dinter | .................... | F03D 80/70 475/159 |
| 2013/0035190 A1 * | 2/2013 | McCune | .................. | F02C 7/32 475/159 |
| 2013/0145880 A1 * | 6/2013 | Yamashita | ............ | F16H 57/042 74/467 |
| 2015/0192199 A1 * | 7/2015 | Feraud | ................ | F16H 57/0442 475/159 |
| 2015/0252889 A1 * | 9/2015 | Feraud | ................ | F16H 57/0442 475/159 |
| 2016/0222975 A1 * | 8/2016 | Sheridan | ................ | F01D 25/20 |
| 2017/0108113 A1 * | 4/2017 | Hasting | ................ | F16H 57/0471 |
| 2017/0219079 A1 * | 8/2017 | Niergarth | .................. | F02C 7/36 |
| 2017/0219080 A1 * | 8/2017 | Niergarth | .................. | F02C 7/36 |
| 2018/0306062 A1 * | 10/2018 | Avis | .......................... | F16N 7/02 |

* cited by examiner

LUBRICATION OF EPICYCLIC GEAR SYSTEM FOR GAS TURBINE ENGINE

BACKGROUND

This present disclosure relates to a gas turbine engine, and more particularly to fluid delivery to a geared architecture of a gas turbine engine.

Gas turbine engines are known and typically include a fan section delivering air into a bypass duct as propulsion air. Further, the fan section delivers air into a compressor section where it is compressed. The compressed air passes into a combustion section where it is mixed with fuel and ignited. Products of this combustion pass downstream over turbine rotors driving them to rotate.

Gas turbine engines may use a geared architecture to connect portions of the fan section to the compressor section, and some gas turbine engines may utilize geared architecture in other areas. Fluids, such as oil are utilized to the geared architecture, in particular to reduce friction and wear between the components of the geared architecture and to remove thermal energy from the geared architecture, improving operating efficiency.

The geared architecture is typically required to allow the fan section to windmill when the gas turbine engine is not operating, for example, when on the ground, and also to allow a range of rotation of the fan section from near zero speed up to near flight idle speed of the compressor section when the gas turbine engine is operating, for example, during flight. It is desired to efficiently provide sufficient fluid to the geared architecture to lubricate the geared architecture under all of these conditions.

BRIEF SUMMARY

In one embodiment, an epicyclic gear system includes a sun gear, a ring gear, and two or more star gear assemblies enmeshed between the sun gear and the ring gear. Each star gear assembly includes a star gear and a journal bearing supportive of the star gear. The journal bearing includes one or more lubricant passageways to deliver a flow of lubricant to a selected location of the star gear assembly, wherein a first cross-sectional area of a lubricant passage of a first journal bearing of the two or more star gear assemblies is greater than a second cross-sectional area of the corresponding lubricant passage of a second journal bearing of the two or more star gear assemblies.

Additionally or alternatively, in this or other embodiments the one or more lubricant passageways includes an axially-extending lubricant passageway, and a radially-extending lubricant passageway fluidly connected to the axially-extending lubricant passage.

Additionally or alternatively, in this or other embodiments the first cross-sectional area is a cross-sectional area of the radially-extending lubricant passageway of the first journal bearing and the second cross-sectional area is a cross-sectional area of the radially-extending lubricant passageway of the second journal bearing.

Additionally or alternatively, in this or other embodiments the first journal bearing is positioned vertically higher than the second journal bearing.

Additionally or alternatively, in this or other embodiments the selected location is an interface defined between a radial inner surface of the star gear and a radial outer surface of the journal bearing.

Additionally or alternatively, in this or other embodiments each journal bearing is fluidly connected to a lubricant manifold.

Additionally or alternatively, in this or other embodiments the two or more star gear assemblies are coupled to a carrier.

Additionally or alternatively, in this or other embodiments five star gear assemblies are enmeshed between the sun gear and the ring gear.

Additionally or alternatively, in this or other embodiments the cross-sectional areas of the lubricant passageways of the journal bearings varies with vertical position of the journal bearings in the epicyclic gear system.

In another embodiment, a gas turbine engine includes a fan section, a compressor section, a combustor section, a turbine section, and an epicyclic gear system to couple the fan section to the compressor section. The epicyclic gear system includes a sun gear, a ring gear, and two or more star gear assemblies enmeshed between the sun gear and the ring gear. Each star gear assembly includes a star gear and a journal bearing supportive of the star gear. The journal bearing includes one or more lubricant passageways to deliver a flow of lubricant to a selected location of the star gear assembly, wherein a first cross-sectional area of a lubricant passage of a first journal bearing of the two or more star gear assemblies is greater than a second cross-sectional area of the corresponding lubricant passage of a second journal bearing of the two or more star gear assemblies.

Additionally or alternatively, in this or other embodiments the one or more lubricant passageways includes an axially-extending lubricant passageway and a radially-extending lubricant passageway fluidly connected to the axially-extending lubricant passage.

Additionally or alternatively, in this or other embodiments the first cross-sectional area is a cross-sectional area of the radially-extending lubricant passageway of the first journal bearing and the second cross-sectional area is a cross-sectional area of the radially-extending lubricant passageway of the second journal bearing.

Additionally or alternatively, in this or other embodiments the first journal bearing is positioned vertically higher than the second journal bearing.

Additionally or alternatively, in this or other embodiments the selected location is an interface defined between a radial inner surface of the star gear and a radial outer surface of the journal bearing.

Additionally or alternatively, in this or other embodiments each journal bearing is fluidly connected to a lubricant manifold.

Additionally or alternatively, in this or other embodiments the two or more star gear assemblies are coupled to a carrier.

Additionally or alternatively, in this or other embodiments five star gear assemblies are enmeshed between the sun gear and the ring gear.

Additionally or alternatively, in this or other embodiments the cross-sectional areas of the lubricant passageways of the journal bearings varies with vertical position of the journal bearings in the epicyclic gear system.

In yet another embodiment, a method of providing a flow of lubricant to an epicyclic gear system includes urging a flow of lubricant from a lubricant source toward the epicyclic gear system, distributing the flow of lubricant to two or more star gear assemblies of the epicyclic gear system, and flowing the flow of lubricant through a lubricant passageway positioned at a journal bearing of each star gear assembly of the two or more star gear assemblies. A first cross-sectional area of a lubricant passage of a first journal bearing of the two or more star gear assemblies is greater than a second cross-sectional area of the corresponding lubricant passage of a second journal bearing of the two or more star gear assemblies.

Additionally or alternatively, in this or other embodiments an interface defined between a radial inner surface of a star gear and a radial outer surface of the journal bearing is lubricated.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
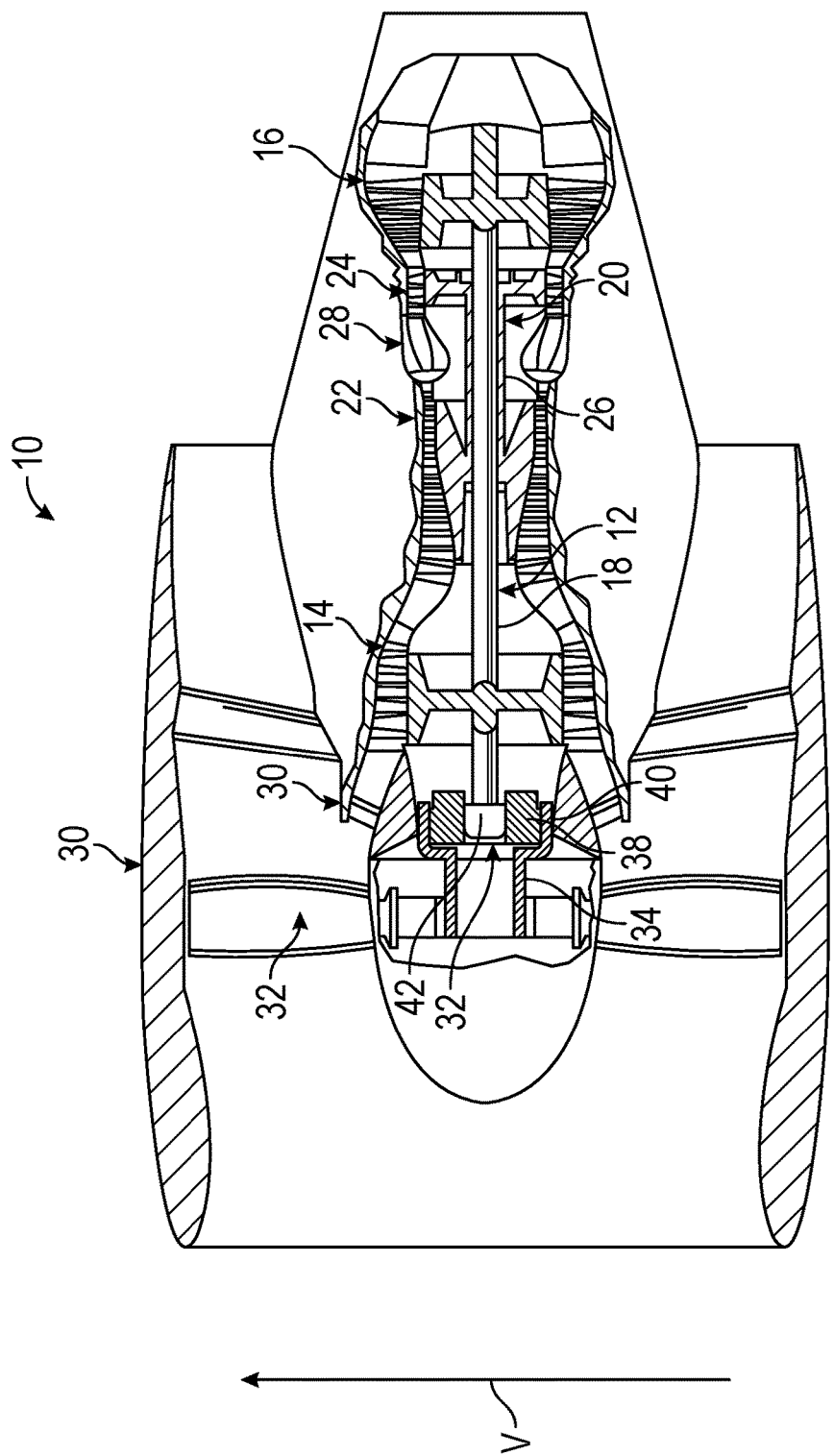
FIG. 1 schematically shows an embodiment of a gas turbine engine.

FIG. 1 is a schematic cross-sectional side view of a gas turbine engine 10, at least partially enclosed in a nacelle 30. Gas turbine engine 10 includes a low pressure unit or pack 12, which includes a low pressure compressor 14 and a low pressure turbine 16 connected by a low pressure shaft 18. Gas turbine engine 10 may further include a high pressure unit or pack 20, which includes a high pressure compressor 22 and a high pressure turbine 24 connected by high pressure shaft 26. Gas turbine engine 10 further includes a combustor 28 at which air from high pressure compressor 22 is mixed with fuel and ignited, creating high pressure exhaust gas that is routed to the high pressure turbine 24 at which energy is extracted driving rotation of the high pressure turbine 24 and the low pressure turbine 16. A fan 32 is driven by a fan shaft 34 connected to the low pressure shaft 18 via an epicyclic gear system 36. Epicyclic gear system 36 includes a plurality of star gears 38 located radially outboard of a sun gear 42, with a ring gear 40 located radially outboard of the plurality of star gears 38.

As shown in FIG. 1, the low pressure unit 12 is coupled to the fan shaft 34 via the epicyclic gear system 36. Sun gear 42 is connected to and rotates with the low pressure shaft 18. The ring gear 40 is operably connected to the fan shaft 34, which rotates at the same speed as fan 32. The star gears 38 are enmeshed between the sun gear 42 and the ring gear 40 such that the star gears 38 rotate when the sun gear 42 rotates. The star gears 38 are rotatably mounted on a stationary gear carrier 48 (shown in FIG. 2) by a stationary journal bearing 44 (shown in FIG. 2). When the low pressure unit 12 rotates, the epicyclic gear system 36 causes the fan shaft 34 to rotate at a slower rotational velocity than that of the low pressure unit 12, and in an opposite rotational direction.

In an alternative embodiment to the embodiment shown in FIG. 1, the epicyclic gear system 36 can be configured in a different manner sometimes called a planetary gear system. In this alternative configuration star or "planet" gears 38 are rotatably mounted on the gear carrier by bearings. Star gears 38 mesh with the sun gear 42. A mechanically grounded, internally toothed ring gear 40 circumscribes and meshes with the star gears 38. Input and output shafts extend from the sun gear 42 and the gear carrier respectively. During operation, the input shaft rotatably drives the sun gear 42, rotating the star gears 38 about their own axes, and because the ring gear 40 is mechanically grounded, causes star gears 38 to orbit the sun gear 42 in the manner of a planet. Orbital motion of star gears 38 turns the gear carrier and the output shaft in the same direction as the input shaft.

Figure 2:
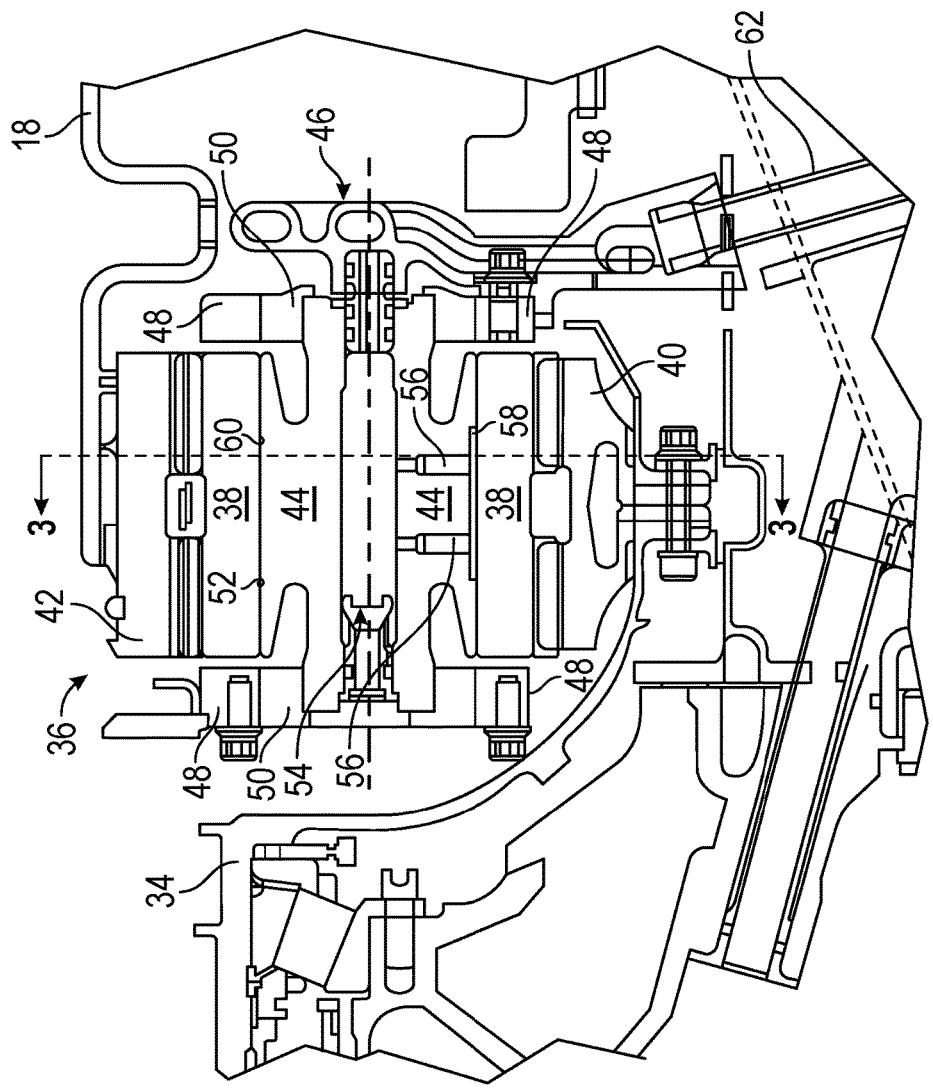
FIG. 2 is a schematic illustration of an embodiment of an intercooled cooling air system.

FIG. 2 is a cross-sectional view of the epicyclic gear system 36 taken through only a single star gear 38. The epicyclic gear system 36, however, includes multiple star gears, for example, 5 star gears, are arranged circumferentially around the sun gear 42. In addition to the star gears 38, the ring gear 40, and the sun gear 42, the epicyclic gear system 36 includes a journal bearing 44 supportive of each star gear 38, a lubricant manifold 46, a carrier 48 to which the journal bearings 44 are operably connected, and end caps 50. The journal bearing 44 has interface surface 52 that interfaces with an inner surface 60 of the star gear 38, and includes axial passage 54 and radial passages 56. Radial passages 56 fluidly connect to a distribution recess 58. The lubricant manifold 46 is connected to a feed tube 62.

As discussed previously, in one embodiment, the low pressure unit 12 (FIG. 1) is coupled to the fan shaft 34 via the epicyclic gear system 36. The sun gear 42 is attached to and rotates with the low pressure shaft 18 (FIG. 1). The sun gear 42 is rotatably mounted on low pressure shaft 18. The carrier 48 is stationarily mounted within gas turbine engine 10 (FIG. 1) to a non-rotating engine case wall radially outboard of gear system 36, or to other rotationally fixed structure of the gas turbine engine 10. The carrier 48 has two generally interfacing faces which support the ends of the stationary journal bearing 44. The ring gear 40 is connected to the fan shaft 34 (FIG. 1) which turns at the same speed as the fan 32 (FIG. 1). The star gears 38 (only one is illustrated although epicyclic gear system 36 includes multiple star gears) are enmeshed between the sun gear 42 and ring gear 40 such that star gears 38 rotate when the sun gear 42 rotates. The star gears 38 are rotatably mounted on the stationary carrier 48 by the journal bearings 44. When the low pressure unit 12 rotates, the epicyclic gear system 36 causes the fan shaft 34 to rotate about a central engine axis at a slower rotational velocity than that of the low pressure unit 12.

In the embodiment shown in FIG. 2, the journal bearing 44 is positioned inside of the rotatable star gear 38. The lubricant manifold 46 is disposed adjacent to the journal bearing 44 and is fluidly connected thereto. The star gear 38 is rotatably mounted on the carrier 48 by the journal bearing 44. In some embodiments, end caps 50 are welded or otherwise affixed to the journal bearing 44 and press fit into the carrier 48. The end caps 50 and the carrier 48 provide support for the journal bearing 44. Fasteners may extend through the end caps 50 and connect to the carrier 48 to act as an anti-rotation feature to keep the journal bearing 44 stationary.

An axial passage 54 is fluidly connected to the lubricant manifold 46. The lubricant manifold 46 is fed pressurized lubricant from a lubricant source, and/or from other components of the gas turbine engine via the feed tube 62. Lubricant from lubricant manifold 46 is supplied through the axial passage 54 to the radial passages 56. After leaving the axial passage 54, the lubricant flows through the radial passages 56 into a distribution recess 58 between the journal bearing 44 and the star gear 38. The distribution recess 58 is defined between the interface surface 52 of the journal bearing 44 and the inner surface 60 of the star gear 38. The lubricant forms a film of lubrication on journal bearing 44 in the distribution recess 58. From the distribution recess 58 the film of lubrication spreads circumferentially and axially due to viscous forces between the star gear 38 and the journal bearing 44. The lubricant film helps to support the star gear 38 and to reduce friction between the inner surface 60 of star gear 38 and the interface surface 52 of the journal bearing 44 as the star gear 38 rotates. To ensure adequate thickness of the lubricant film, the rate the lubricant is fed to the distribution recess 58 varies and is determined by the pressure profile and temperature at the interface between the star gears 38 and the journal bearings 44. In one embodiment, the flow rate of the lubricant provides the interface surface 52 of the journal bearing 44 With a minimum lubricant film thickness of between about 0.00254 mm (100 micro inches) and 0.0508 mm (2000 micro inches).

Figure 3:
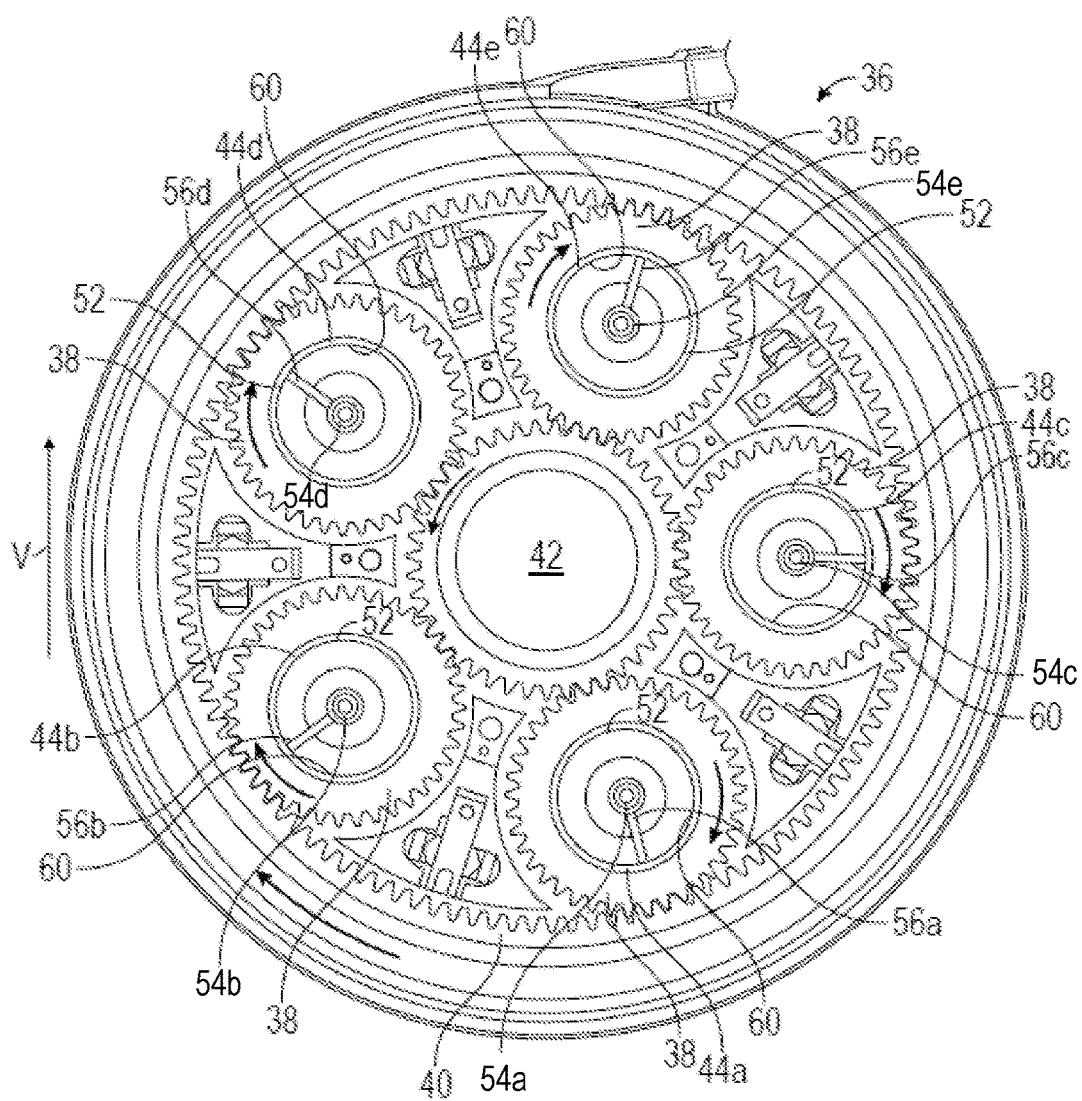
FIG. 3 is a cross-sectional view of an embodiment of an epicyclic gear system for a gas turbine engine.

FIG. 3 shows a schematic, view of the epicyclic gear system 36 taken along section 3-3 of FIG. 2, including a plurality of star gears 38. In the embodiment illustrates, five star gears 38 are included, but it is to be appreciated that in other embodiments other quantities of star gears 38 may be used. As previously stated, the epicyclic gear system is required to operate at a wide range of rotational speeds, and the required flow rate of lubricant to the distribution recess 58 is proportional to a rotational speed of the star gear 38 at the journal bearing 44 to prevent wear of the journal bearing 44. As the rotational speed of the fan 32 is slowed, the rotational speed of the star gears 38 is slowed, thus requiring a lower flow rate of lubricant to the distribution recess 58 to prevent wear of the journal bearing 44. The lubricant supply flow rate is regulated by a cross-sectional area of the radial passages 56, and may be limited by a lubricant supply pressure at the lubricant manifold 46.

When, for example, the gas turbine engine 10 is not running, the fan 32 is required to windmill or freely rotate, requiring lubricant at the distribution recesses 58. With the gas turbine engine 10 not running, however, lubricant pressure at the lubricant manifold 46 is greatly reduced, with the lubricant manifold affected by gravity such that while the distribution recesses 58 at or near a bottom of the epicyclic gear system 36 may be adequately supplied with lubricant, while those distribution recesses at or near the top of the epicyclic gear system 36 may be starved of lubricant.

To address this, in the embodiment of FIG. 3, the cross-sectional areas of the radial passages 56 differ for the journal bearings 44 depending on a vertical position of the journal bearings 44 in the epicyclic gear system 36. For example, vertical axis V is defined in FIG. 3. As such, journal bearing 44a is located lowermost along this axis, journal bearing 44e is located uppermost along the axis, and journal bearings 44b, 44c and 44d are sequentially located between journal bearings 44a and 44e. To provide adequate lubricant flow to journal bearing 44e during all conditions, a cross-sectional area of radial passage 56a is less than that of radial passage 56e of journal bearing 56e. Further, in some embodiments the cross-sectional areas of radial passages 56b, 56c and 56d of journal bearings 44b, 44c and 44d respectively are between the cross-sectional areas of radial passages 56a and 56e.

In another embodiment, an addition to or as an alternative to sizing of the radial passages 56 based on position along the V axis, cross-sectional areas of axial passages 54 may vary based on position along the V-axis, with the axial passage 54e of journal bearing 44e being cross-sectionally larger than axial passage 54a of journal bearing 44a. Similarly, in some embodiments the cross-sectional areas of axial passages 54b, 54c and 54d of journal bearings 44b, 44c and 44d respectively may be between the cross-sectional areas of axial passages 54a and 54e.

Varying the cross-sectional size of the radial passages 56 and/or the axial passages 54 based on position along the V axis ensures adequate supply of lubricant to the uppermost journal bearing 44e under all operating conditions, regardless of lubricant supply pressure at the lubricant manifold 46.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An epicyclic gear system comprising:
   a sun gear;
   a ring gear; and
   two or more star gear assemblies enmeshed between the sun gear and the ring gear, each star gear assembly including:
      a star gear; and
      a journal bearing supportive of the star gear;
      wherein the journal bearing includes one or more lubricant passageways to deliver a flow of lubricant to a selected location of the star gear assembly, wherein a first cross-sectional area of a lubricant passage of a first journal bearing of the two or more star gear assemblies is greater than a second cross-sectional area of the corresponding lubricant passage of a second journal bearing of the two or more star gear assemblies; and
      wherein the first journal bearing is positioned vertically higher than the second journal bearing.

2. The epicyclic gear system of claim 1, wherein the one or more lubricant passageways includes:
   an axially-extending lubricant passageway; and
   a radially-extending lubricant passageway fluidly connected to the axially-extending lubricant passage.

3. The epicyclic gear system of claim 2, wherein the first cross-sectional area is a cross-sectional area of the radially-extending lubricant passageway of the first journal bearing and the second cross-sectional area is a cross-sectional area of the radially-extending lubricant passageway of the second journal bearing.

4. The epicyclic gear system of claim 1, wherein the selected location is an interface defined between a radial inner surface of the star gear and a radial outer surface of each journal bearing.

5. The epicyclic gear system of claim 1, wherein each journal bearing is fluidly connected to a lubricant manifold.

6. The epicyclic gear system of claim 1, further comprising a carrier to which the two or more star gear assemblies are coupled.

7. The epicyclic gear system of claim 1, further comprising five star gear assemblies enmeshed between the sun gear and the ring gear.

8. The epicyclic gear system of claim 7, wherein the cross-sectional areas of the lubricant passageways of the journal bearings varies with vertical position of the journal bearings in the epicyclic gear system.

9. A gas turbine engine comprising:
   a fan section;
   a compressor section;
   a combustor section;
   a turbine section; and
   an epicyclic gear system to couple the fan section to the compressor section, the epicyclic gear system including:
      a sun gear;
      a ring gear; and
      two or more star gear assemblies enmeshed between the sun gear and the ring gear, each star gear assembly including:
         a star gear; and
         a journal bearing supportive of the star gear;
      wherein the journal bearing includes one or more lubricant passageways to deliver a flow of lubricant to a selected location of the star gear assembly, wherein a first cross-sectional area of a lubricant passage of a first journal bearing of the two or more star gear assemblies is greater than a second cross-sectional area of the corresponding lubricant passage of a second journal bearing of the two or more star gear assemblies; and
      wherein the first journal bearing is positioned vertically higher than the second journal bearing.

10. The gas turbine engine of claim 9, wherein the one or more lubricant passageways includes:
    an axially-extending lubricant passageway; and
    a radially-extending lubricant passageway fluidly connected to the axially-extending lubricant passage.

11. The gas turbine engine of claim 10, wherein the first cross-sectional area is a cross-sectional area of the radially-extending lubricant passageway of the first journal bearing and the second cross-sectional area is a cross-sectional area of the radially-extending lubricant passageway of the second journal bearing.

12. The gas turbine engine of claim 9, wherein the selected location is an interface defined between a radial inner surface of the star gear and a radial outer surface of each journal bearing.

13. The gas turbine engine of claim 9, wherein each journal bearing is fluidly connected to a lubricant manifold.

14. The gas turbine engine of claim 9, further comprising a carrier to which the two or more star gear assemblies are coupled.

15. The gas turbine engine of claim 9, further comprising five star gear assemblies enmeshed between the sun gear and the ring gear.

16. The gas turbine engine of claim 15, wherein the cross-sectional areas of the lubricant passageways of the journal bearings varies with vertical position of the journal bearings in the epicyclic gear system.

17. A method of providing a flow of lubricant to an epicyclic gear system comprising:
    urging a flow of lubricant from a lubricant source toward the epicyclic gear system;
    distributing the flow of lubricant to two or more star gear assemblies of the epicyclic gear system; and
    flowing the flow of lubricant through a lubricant passageway disposed at a journal bearing of each star gear assembly of the two or more star gear assemblies;
    wherein a first cross-sectional area of a lubricant passage of a first journal bearing of the two or more star gear assemblies is greater than a second cross-sectional area of the corresponding lubricant passage of a second journal bearing of the two or more star gear assemblies; and
    wherein the first journal bearing is positioned vertically higher than the second journal bearing.

18. The method of claim 17, further comprising lubricating an interface defined between a radial inner surface of a star gear and a radial outer surface of each journal bearing.

* * * * *